United States Patent [19]

Beazley

[11] 4,196,636

[45] Apr. 8, 1980

[54] MECHANISM CONTROL DEVICE

[76] Inventor: Rodney T. Beazley, 19, Lancet La., Maidstone, Kent, England

[21] Appl. No.: 871,342

[22] Filed: Jan. 23, 1978

[30] Foreign Application Priority Data

Jan. 21, 1977 [GB] United Kingdom ............. 2485/77

[51] Int. Cl.² ........................................... G05G 17/00
[52] U.S. Cl. ......................................... 74/2; 74/110;
74/469; 137/73; 137/77; 337/409; 337/412
[58] Field of Search ............... 74/2, 110, 469; 137/72,
137/73, 75, 77; 200/331; 337/409, 412

[56] References Cited

U.S. PATENT DOCUMENTS

| 727,205 | 5/1903 | Root et al. | 137/77 |
|---|---|---|---|
| 2,484,940 | 10/1949 | Franzheim | 137/77 |
| 2,610,614 | 9/1952 | Sedgwick | 74/479 X |
| 2,702,179 | 2/1955 | Grunt | 137/77 X |

Primary Examiner—Allan D. Herrmann
Attorney, Agent, or Firm—Burns, Doane, Swecker & Mathis

[57] ABSTRACT

A control apparatus is disclosed for regulating the movement of a control stem which is biased in a given direction. The apparatus comprises a housing forming a chamber and a plurality of passages. The chamber receives the control stem in its direction of bias, the latter abutting against a restraining sphere disposed in the chamber. A pair of pistons are movably disposed in remaining ones of the passages to maintain the sphere in the chamber. The pistons are movable to allow the sphere to enter a passage so that the stem can move further into the chamber. The pistons can be moved manually or automatically, as by means of a fusible element which melts in response to the heat of a fire.

13 Claims, 3 Drawing Figures

MECHANISM CONTROL DEVICE

The present invention relates to a mechanism control device, more particularly to such a device which is operable automatically to a "fail safe condition" under certain circumstances and manually, even remotely, at will.

According to the present invention there is provided a mechanism control device comprising a housing having a plurality of passages leading to a central chamber in which a rigid sphere is disposed, one passage being arranged to receive a stem under pressure from the mechanism and permit it to extend to the central chamber to be supported therein by the sphere, a piston in each of the remaining passages adapted to prevent the sphere from escaping from the chamber during the operation of the device, each piston being operable, to release the sphere and so relax the pressure on the stem. In a preferred embodiment, each piston can be adapted to operate automatically under certain conditions, or be operated automatically, at will. Likewise in the preferred embodiment, at least one of the pistons is arranged to be retained under pressure from the sphere, during operation, by a fusible cap screwed up against the piston or extension thereof, such as a plunger or rod, the cap being formed from a material having a low melting point relative to the rest of the housing, such that under conditions of fire or intense heat the piston or extension thereof can readily penetrate it to release the sphere and thus close off the mechanism.

In a further embodiment, a piston is releasable manually by withdrawing a rod or rigid cable attached thereto, which manual operation may be effected mechanically (pneumatically or hydraulically) or electrically.

Again, an extension of a piston, especially one which penetrates a fusible cap, may be employed to perform operations such as energising a solenoid to operate a fire alarm.

While any cross-sectional configuration of passage and corresponding piston or stem may be used in this context, the circular appears to be the most acceptable and readily adaptable to receive a sphere of a slightly less diameter.

The mechanism control device when in operation, comes under the direct influence of the mechanism with which it is associated—a resilient member adapted to retain the mechanism in the closed-off condition provides the pressure in the device through the medium of the stem and maintains the rigid sphere in equilibrium against the piston, thus it will be clear that when the equilibrium is changed, for example by the removal of the restraining pressure from one or other of the pistons, that piston is then free to travel down the cylinder and the sphere will follow down thereafter thus actuating the device to permit the stem of the valve to travel leaving the valve in the closed condition.

The device is reset in its original position by re-applying the pressure to the piston which then causes it to travel in its cylindrical passage to the original position.

While this mechanism control device was originally developed to work in conjunction with an isolating valve, it will be obvious, especially to those skilled in the art concerned, that it is of much wider application, being easily adaptable for use with most hydraulic and pneumatic valves and many other mechanisms.

Having in mind an isolating valve, an embodiment of the invention will now be described, by way of example only, with reference to the accompanying drawings in which:

FIG. 2 is a perspective, part sectional, view of one modification of the device; while

Figure 1:
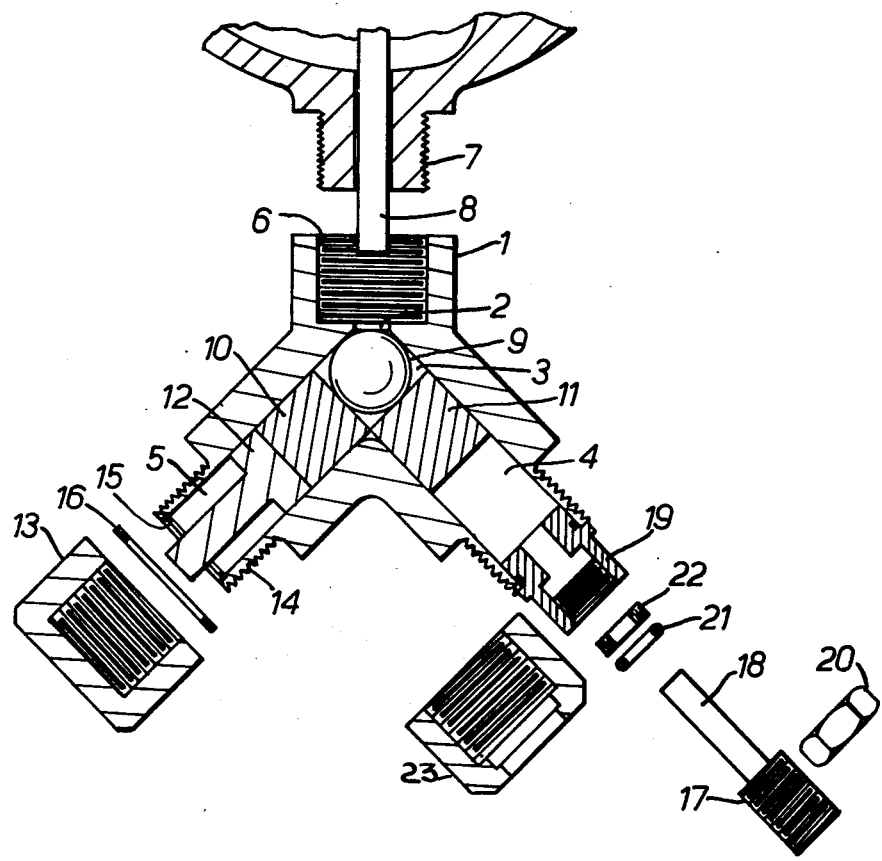
FIG. 1 is a longitudinal section and part exploded view of the device according to the invention.

Referring to the drawings and mostly to FIG. 1 thereof, a control mechanism comprises a hollow cylindrical casing 1, manufactured from gunmetal and suitable for withstanding temperatures in the region of 800° C. A single cylindrical passage 2 extends to a chamber 3 therein while two other like passages 4 and 5 extend radially therefrom. The first mentioned passage 2 is threaded at the outer end, 6, and is thus adapted for connection to a mating thread on a valve body 7, with which the control device will operate. A stem 8 of the valve projects from the valve body and into the chamber in the control device where it is held in contact with a hard sphere 9, by means of a spring (not shown) within the valve.

The sphere which is adapted to enter any one of the three passages mentioned, being slightly less in diameter, is restrained in the chamber by two pistons 10 and 11 equally disposed at the chamber entrances to the passages 5 and 4 respectively, and the valve stem.

As indicated above the diameters of the passages are such as will permit the free movement of the sphere by the pistons therein. The sphere which is normally held during operation, in the apex position of the two cylinders, can also move freely into either passages when the pistons are released. The piston 10 which operates in passage 5 is restrained in position by a plunger 12 which is itself restrained by means of a fusible cap 13 screwed on to the threaded end 14 of the cylinder. The threaded end of the cylinder is identical to that on the base of the valve body. The plunger is prevented from falling out of the cylinder, by a circlip 15.

The piston 11 operates in the passage 4 where it is held in constant contact while in operation, with the sphere 9 by means of the pressure exerted on the sphere from the valve stem 8 on one side and by a rigid end 18 of a flexible cable 17 which protrudes into the cylinder and is held in position by a cable and connector 19 to which the outer casing of the flexible cable is attached.

The flexible cable 17 with its connector 19 is held in position by a nut 23 which is screwed into position at the end of the passage 4. "O" ring 21 and a seal 22 prevent leakage of fluid between the flexible cable 17 and the end of the cylinder, while a lock nut 20 locks the flexible cable into position on cable connector 19.

Figure 2:
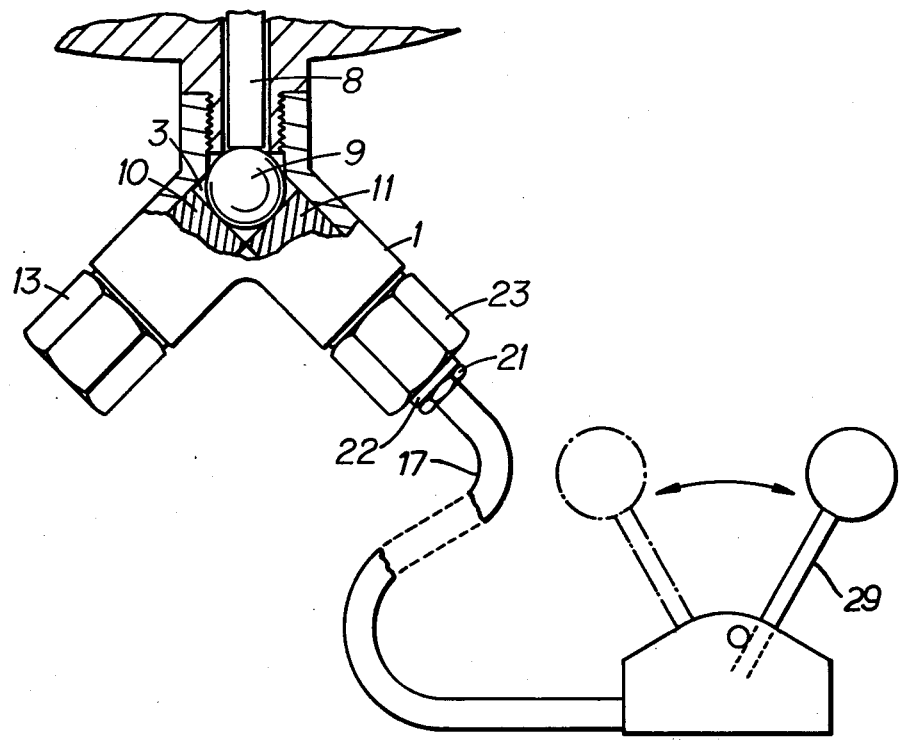

Referring to FIG. 2, the control device is shown having the flexible cable secured at one end to a mounting bracket, (not shown) and at the other end to a lever control member fixed to a fork member for manual operation or alternatively to be connected to a hydraulic, pneumatic or electrically operated sensing device and operating mechanism.

In the normal open position of the valve to which the control device is attached, the spring or pressure loaded valve stem is held in the open position and restrained in position by sphere 9 which is held at the top of the apex of the cylinders by the piston and plunger which is itself restrained by the end of the fusible cap, while the piston 11 is held in position by the rigid end 18 of the flexible cable 17 and at the other end by lever 29 connected through fork end, (not shown) in a housing where the control device is operated to hold the valve in the open position.

In the case of fire, when the fusible cap 13 melts, there is no further restraint on the plunger 12 or piston 10 which move down its cylinder until the plunger reaches the circlip 15 where it is restrained. This action permits the sphere 9 to follow as a result of the pressure exerted on it through the valve stem 8 which then permits the valve to change from the open to the closed position. The piston 11 remains in its original position where the upper face then forms a guidance path for the sphere to be directed into the now open cylinder.

In the absence of a fire, when the fusible cap remains intact and in position, it is possible to change the valve from the open to the closed position and vice versa, in which case the control device is being used for remote control purposes, by operating the remote control lever 29. When this lever is moved into the closed position the control part of the flexible cable moves relative to the outer cable and rigid end 18 moves away from piston 11 in passage 4. This permits piston 11 to move down the passage followed by the sphere 9, thus permitting the valve stem 8 to change from the open to the closed position. Piston 10 is unaffected by the operation of lever 29 and remains in its original position in the cylinder forming a guide to the sphere as it passes into the other cylindrical passage.

Figure 3:
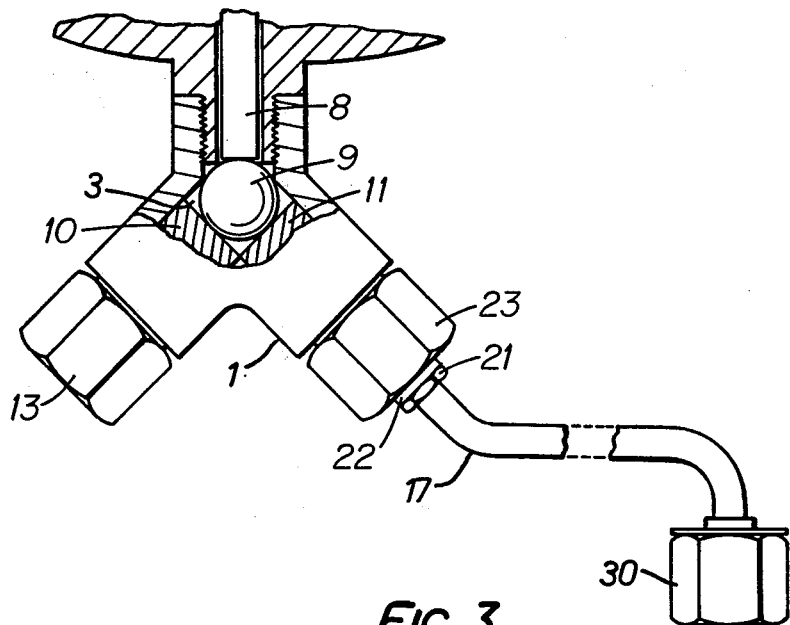
FIG. 3 is a sectional view of a further modification, thereof.

Referring to FIG. 3 in more detail, an arrangement is shown where a fire isolating valve can be operated either directly at the valve by the fusible cap or remotely by a further fusible cap 30 connected to the end of flexible cable 17. Fusible caps of different material operating at different temperatures may be used, or both caps may be of the same material, while an extension of the plunger or piston may be adapted to perform operations such as energising a solenoid to operate a, say, fire alarm.

In the case of remote operation, when the fusible cap 30 melts, piston 11 is no longer restrained by the cable end 18 and travels down its cylinder followed by the sphere 9 under pressure from the valve stem 8 which travels into the closed position of the valve. If the temperature is such that fusible cap 13 is not melted and remains in position, then the piston 10 remains in position and the valve is closed by remote operation. If the temperature is such that the two fusible caps melt then sphere 9 is free to travel down either cylinder and in either case the valve moves into the closed position.

What I claim is:

1. A mechanism control device comprising:
   a housing having a plurality of passages leading to a central chamber,
   one of said passages being arranged to receive a biased stem such that the stem extends to said chamber under its bias,
   a single rigid sphere normally disposed in said chamber to abut against the stem and act against the bias of the stem to resist further displacement thereof in the direction of said chamber, and
   a pair of pistons movably disposed in remaining ones of said passages to maintain said sphere in said chamber,
   said pistons each being movable in a direction allowing said sphere to enter an associated passage so that the biased stem can move further into said chamber under the urging of its bias.

2. A mechanism control device as claimed in claim 1, wherein the remaining passages are cylindrical, each piston fitting correspondingly therein.

3. A mechanism control device as claimed in claim 1, in which the stem and passages accommodating it are rectangular in cross-section.

4. A mechanism control device as claimed in claim 1 in which at least one of the pistons making contact with the sphere is adapted to be retained in that position during operation of the device by means of a fusible cap disposed at the end of the passage, the fusible cap being formed from a material with a low melting point.

5. A mechanism control device as claimed in claim 4, including a "fail safe" arrangement wherein the movement provided by the collapse of the device in its working condition is directed to doing work, such as the operation of a signal or the energising of another mechanism.

6. A mechanism control device as claimed in claim 4, in which the fusible cap is in immediate contact with an element which abuts against said piston.

7. A mechanism control device as claimed in claim 6, wherein said element comprises a rod.

8. A mechanism control device as claimed in claim 6, wherein said element comprises a cable.

9. A mechanism control device as claimed in claim 6, wherein said element comprises a plunger.

10. A mechanism control device as claimed in claim 1, including manually operable apparatus for moving one of said pistons into contact with the sphere and restraining it from escaping the chamber under pressure from the stem.

11. A mechanical control device as claimed n claim 10, in which the manually operable apparatus includes a cable extending from the last-named one of said pistons to an external actuating lever which provides remote control for the device.

12. A mechanism control device as claimed in claim 10, in which the manually operable apparatus is replaceable by a fusible cap.

13. In a system whereby a control apparatus regulates movement of a control stem which is biased in a given direction, the improvement wherein said control apparatus comprises:
    a housing forming a chamber and a plurality of passages communicating with said chamber, said chamber being sized to receive the control stem in its direction of bias,
    a single restraining member disposed in said chamber to restrain the biased stem against further movement in its direction of its bias toward said chamber,
    first and second retractible members movably mounted in said housing and normally disposed in first positions adjacent said chamber to prevent movement of said restraining member from said chamber to said first and second passages, respectively, said retractible members being independently retractible to second positions to allow said restraining member to leave said chamber and enter a passage to allow said stem to travel in the direction of said chamber under the urgings of its bias,
    first releasable means normally holding said first retractible member in said first position and being releasable to enable said first restraining member to be retracted to its second position, and second releasable means normally holding said second restraining member in said first position and being releasable independently of said first releasable means to enable said second restraining member to move to its second position;

at least one of said first and second releasable means being releasable automatically in response to sensing a condition adjacent said housing.

* * * * *